United States Patent
Sekiyama et al.

(10) Patent No.: US 8,497,317 B2
(45) Date of Patent: Jul. 30, 2013

(54) PREPARATION METHOD FOR AQUEOUS POLYURETHANE RESIN-PIGMENT DISPERSION, AQUEOUS POLYURETHANE RESIN-PIGMENT DISPERSION, AND INK COMPOSITION

(75) Inventors: Makoto Sekiyama, Tokyo (JP); Shigehiro Tanaka, Tokyo (JP)

(73) Assignee: Tokai Carbon Co., Ltd., Tokyo (JP)

( * ) Notice: Subject to any disclaimer, the term of this patent is extended or adjusted under 35 U.S.C. 154(b) by 0 days.

(21) Appl. No.: 13/390,445

(22) PCT Filed: Sep. 1, 2010

(86) PCT No.: PCT/JP2010/064936
§ 371 (c)(1),
(2), (4) Date: Apr. 13, 2012

(87) PCT Pub. No.: WO2011/027785
PCT Pub. Date: Mar. 10, 2011

(65) Prior Publication Data
US 2012/0190789 A1    Jul. 26, 2012

(30) Foreign Application Priority Data
Sep. 2, 2009    (JP) ................. 2009-202528

(51) Int. Cl.
*C08G 18/08*    (2006.01)
*C08L 75/00*    (2006.01)
*C08K 5/01*    (2006.01)
*C08L 53/00*    (2006.01)

(52) U.S. Cl.
USPC ....... 524/591; 106/31.75; 106/31.9; 106/400; 525/474; 528/28

(58) Field of Classification Search
CPC ........ C09D 11/10; C08L 75/04; C08K 5/3417; C08K 5/3437; C08G 18/04
USPC ................ 106/31.75, 31.9, 400; 524/88, 90, 524/590, 591; 525/474; 528/28, 65, 75
See application file for complete search history.

(56) References Cited

U.S. PATENT DOCUMENTS

| | | | |
|---|---|---|---|
| 4,985,490 A | 1/1991 | Rosthauser et al. | |
| 2004/0102542 A1 | 5/2004 | Pears et al. | |
| 2008/0145563 A1 | 6/2008 | Heischkel et al. | |
| 2011/0021675 A1* | 1/2011 | Shigemori et al. | 524/88 |

FOREIGN PATENT DOCUMENTS

| | | |
|---|---|---|
| JP | 2-294317 A | 12/1990 |
| JP | 5-320574 A | 12/1993 |
| JP | 8-3498 A | 1/1996 |
| JP | 8-218015 A | 8/1996 |
| JP | 11-242362 A | 9/1999 |
| JP | 2000-226511 A | 8/2000 |
| JP | 2004-144787 A | 5/2004 |
| JP | 2004-516355 A | 6/2004 |
| JP | 2007-291194 A | 11/2007 |
| JP | 2007-297436 A | 11/2007 |
| JP | 2007-308582 A | 11/2007 |
| JP | 2008-531778 A | 8/2008 |
| JP | 2009-155583 A | 7/2009 |
| WO | 99/42428 A1 | 8/1999 |
| WO | 02/50197 A1 | 6/2002 |
| WO | 2006/089933 A1 | 8/2006 |

OTHER PUBLICATIONS

International Search Report of PCT/JP2010/064936, mailing date of Dec. 7, 2010.

* cited by examiner

*Primary Examiner* — Bijan Ahvazi
(74) *Attorney, Agent, or Firm* — Westerman, Hattori, Daniels & Adrian, LLP

(57) ABSTRACT

A method of producing a polyurethane resin-bonded pigment aqueous dispersion includes causing (I) a pigment having a surface acidic group to come in contact with (II) a basic compound having two or more amino groups selected from a primary amino group and a secondary amino group in its molecule in an aqueous medium so that the pigment has an unreacted surface amino group, and causing the pigment to come in contact and react with (III) a polyurethane resin having an isocyanate end group. A polyurethane resin-bonded pigment aqueous dispersion produced by the method exhibits excellent image density, dispersibility, and storage stability.

8 Claims, No Drawings

PREPARATION METHOD FOR AQUEOUS POLYURETHANE RESIN-PIGMENT DISPERSION, AQUEOUS POLYURETHANE RESIN-PIGMENT DISPERSION, AND INK COMPOSITION

TECHNICAL FIELD

The invention relates to a method of producing a polyurethane resin-bonded pigment aqueous dispersion, a polyurethane resin-bonded pigment aqueous dispersion, and an ink composition.

BACKGROUND ART

In recent years, an aqueous ink that is safe and has small environmental impact has been used in various fields instead of an organic solvent ink. In business applications, an odorless aqueous coloring material is indispensable as an ink used for printing in offices. In industrial applications, there has been an increasing tendency to reduce the use of an organic solvent as much as possible from the viewpoint of an improvement in working environment, an improvement in safety of ink and paint, and waste disposal. An aqueous coloring material also has an advantage in that the production cost can be reduced as compared with an organic solvent coloring material since a special explosion-proof system and a ventilator are unnecessary during production.

A dye or a pigment has been mainly used as the aqueous coloring material depending on the application. A dye can easily form a high-resolution image that exhibits an excellent tone, but exhibits poor light resistance as compared with a pigment. A pigment exhibits poor dispersibility as compared with a dye, but exhibits excellent water resistance and light resistance. A number of pigment inks have been developed along with the development of dispersion technique.

An aqueous ink for gravure printing or offset printing has been developed. An inkjet recording method has been most widely used as an aqueous ink recording method for office applications. The inkjet recording method discharges ink droplets from a minute nozzle head to record characters or figures on the surface of a recording medium (e.g., paper). The noncontact inkjet recording method can implement easy on-demand full-color printing of an image on various recording media (e.g., plain paper) without requiring a printing plate.

An inkjet printer that utilizes the inkjet recording method discharges ink droplets from a minute nozzle head to record characters or figures on the surface of a recording medium (e.g., paper). Typical inkjet printing methods include a Bubble Jet (registered trademark) method and a piezo method. The Bubble Jet method instantaneously heats an ink introduced into the nozzle head using a heater to produce bubbles, and intermittently discharges the ink by utilizing the volume expansion due to the bubbles. The piezo method converts an electrical signal into a mechanical signal using an electrostrictive element (piezoelectric element), and intermittently discharges ink droplets stored in the nozzle head.

A black inkjet printer ink composition has been widely used in offices and the like mainly in order to print documents. A number of aqueous black pigment ink compositions that are optimized for the recording method and the recording speed of each printer have been proposed.

For example, Patent Document 1 discloses an aqueous black pigment ink composition that is provided with improved dispersibility in an aqueous medium by hydrophilizing the surface of the black pigment. However, since the ink composition disclosed in Patent Document 1 may penetrate when printed on plain paper, a decrease in image density, offset, curling of the recording paper, and the like may occur. In particular, since the amount of ink discharged per unit time has increased along with an increase in printing speed of inkjet printers, a sufficient image density may not be obtained when using a related-art aqueous black pigment.

Since a pigment exhibits a strong interparticle cohesive force, but exhibits weak affinity to an organic polymer, water, an organic solvent, and the like, it is very difficult to uniformly mix or disperse a pigment under normal mixing or dispersion conditions. In order to deal with this problem, attempts have been made to improve the dispersibility of a pigment by improving the affinity of the pigment to a solid or liquid component by causing a dispersant (e.g., surfactant or resin) to be adsorbed on the surface of the pigment, or coating the entire surface of the pigment with the dispersant (see Patent Document 2, for example).

RELATED-ART DOCUMENT

Patent Document

Patent Document 1: JP-A-08-003498
Patent Document 2: JP-A-08-218015

SUMMARY OF THE INVENTION

Problems to be Solved by the Invention

The inventors of the invention conducted extensive studies, and found that an aqueous pigment ink composition in which a dispersant is adsorbed on the surface of a pigment has a problem in that the dispersant may be removed from the surface of the pigment due to a strong shear force that occurs when the ink composition is discharged from the thin nozzle of the nozzle head, or the dispersant may be removed from the surface of the pigment during long-term storage, so that the dispersion state of the pigment may become unstable (i.e., the storage stability may deteriorate). When forming a pigment microcapsule by coating the entire surface of the pigment with the dispersant, the image density significantly decreases although the storage stability is improved.

Accordingly, an object of the invention is to provide a method of producing a polyurethane resin-bonded pigment aqueous dispersion that exhibits excellent image density, dispersibility, and storage stability, a polyurethane resin-bonded pigment aqueous dispersion, and an ink composition.

Means for Solving the Problems

The inventors further conducted extensive studies in order to achieve the above object, and found that the above object can be achieved by producing a polyurethane resin-bonded pigment aqueous dispersion by causing (I) a pigment having a surface acidic group to come in contact with (II) a basic compound having two or more amino groups selected from a primary amino group and a secondary amino group in its molecule in an aqueous medium so that the pigment has an unreacted surface amino group, and causing the pigment to come in contact and react with (III) a polyurethane resin having an isocyanate end group. This finding has led to the completion of the invention.

Specifically, the invention provides the following.
(1) A method of producing a polyurethane resin-bonded pigment aqueous dispersion including causing (I) a pigment having a surface acidic group to come in contact with (II) a basic compound having two or more amino groups selected from a primary amino group and a secondary amino group in its molecule in an aqueous medium so that the pigment has an unreacted surface amino group, and causing the pigment to come in contact and react with (III) a polyurethane resin having an isocyanate end group.

(2) The method according to (1), wherein the pigment is carbon black.

(3) A polyurethane resin-bonded pigment aqueous dispersion produced by causing (I) a pigment having a surface acidic group to come in contact with (II) a basic compound having two or more amino groups selected from a primary amino group and a secondary amino group in its molecule in an aqueous medium so that the pigment has an unreacted surface amino group, and causing the pigment to come in contact and react with (III) a polyurethane resin having an isocyanate end group.

(4) The polyurethane resin-bonded pigment aqueous dispersion according to (3), wherein the pigment is carbon black.

(5) An ink composition including a polyurethane resin-bonded pigment aqueous dispersion produced by the method according to (1) or (2), or the polyurethane resin-bonded pigment aqueous dispersion according to (3) or (4).

Effects of the Invention

The invention thus provides a method of producing a polyurethane resin-bonded pigment aqueous dispersion that exhibits excellent image density, dispersibility, and storage stability by chemically bonding the pigment having a surface acidic group to the polyurethane resin (dispersant) having an isocyanate end group via the basic compound having two or more amino groups selected from a primary amino group and a secondary amino group in its molecule, a polyurethane resin-bonded pigment aqueous dispersion, and an ink composition.

DESCRIPTION OF EXEMPLARY EMBODIMENTS

Method of Producing Polyurethane Resin-Bonded Pigment Aqueous Dispersion

A method of producing a polyurethane resin-bonded pigment aqueous dispersion according to one embodiment of the invention is described below.

The method of producing a polyurethane resin-bonded pigment aqueous dispersion according to one embodiment of the invention includes causing (I) a pigment having a surface acidic group to come in contact with (II) a basic compound having two or more amino groups selected from a primary amino group and a secondary amino group in its molecule in an aqueous medium so that the pigment has an unreacted surface amino group, and causing the pigment to come in contact and react with (III) a polyurethane resin having an isocyanate end group.

A pigment having an acidic surface is preferable as the pigment (I) having a surface acidic group. A pigment that has been subjected to surface acidification using a synergist may be used as the pigment (I). An aqueous dispersion in which a pigment that has been acidified by a surface treatment and neutralized using a counter ion is dispersed in water may also be used.

A black pigment is preferable as the pigment. Specific examples of the black pigment include ivory black, peach black, lamp black, mars black, bitumen, titanium black, carbon black, and the like. Among these, carbon black may preferably be used since carbon black exhibits excellent blackness and tinting strength when used as an inkjet recording black pigment.

Examples of the carbon black include furnace black, channel black, acetylene black, thermal black, and the like. The carbon black has a high carbon content, exhibits high blackness due to an amorphous structure, has a high drying rate as compared with peach black, lamp black, and the like, exhibits high storage stability, and is inexpensive.

A pigment aqueous dispersion produced using ultrafine carbon black (e.g., furnace black or channel black) exhibits high resolution and excellent print quality when used as an inkjet printer ink composition.

It is preferable to use carbon black having a specific surface area by nitrogen adsorption ($N_2SA$) of 50 $m^2/g$ or more, more preferably 50 to 300 $m^2/g$, and still more preferably 80 to 250 $m^2/g$. It is preferable to use carbon black having a DBP absorption number of 50 $cm^3/100$ g or more, more preferably 50 to 200 $cm^3/100$ g, and still more preferably 80 to 180 $cm^3/100$ g.

If the specific surface area by nitrogen adsorption ($N_2SA$) and the DBP absorption number of the carbon black are within the above range, the resulting polyurethane resin-bonded pigment aqueous dispersion exhibits excellent dispersibility in an aqueous medium and excellent ink performance when used as an inkjet printer ink composition.

Note that the term "specific surface area by nitrogen adsorption ($N_2SA$)" used herein refers to a value measured in accordance with "Carbon black for rubber industry—Fundamental characteristics—Part 2: Determination of specific surface area—Nitrogen adsorption methods—single-point procedures" specified in JIS K 6217-2, and the term "DBP absorption number" used herein refers to a value measured in accordance with "Carbon black for rubber industry—Fundamental characteristics—Part 4: Determination of dibutylphthalate absorption number" specified in JIS K 6217-4.

The primary particle size of the carbon black is preferably 10 to 70 nm, more preferably 15 to 43 nm, and still more preferably 18 to 30 nm Note that the term "primary particle size" used herein refers to an arithmetic mean diameter (number average) measured using an electron microscope.

Specific examples of the carbon black include Tokablack #8500, Tokablack #8500F, Tokablack #7550SB, Tokablack #7550F (manufactured by Tokai Carbon Co., Ltd.), #650, #750, MA600, #44B, #44, #45B, MA7, MA11, #47, #45, #33, #45L, #47, #50, #52, MA77, MA8 (manufactured by Mitsubishi Chemical Corp.), FW200, FW2V, FWI, FW18PS, NIpex 180 IQ, FW1, Special Black 6, S160, S170 (manufactured by Degussa), Black Pearls 1000M, Black Pearls 800, Black Pearls 880, Monarch 1300, Monarch 700, Monarch 880, CRX 1444, Regal 330R, Regal 660R, Regal 660, Regal 415R, Regal 415, Black Pearls 4630, Monarch 4630 (manufactured by Cabot), Raven 7000, Raven 3500, Raven 5250, Raven 5750, Raven 5000 ULTRA II, HV 3396, Raven 1255, Raven 1250, Raven 1190, Raven 1000, Raven 1020, Raven 1035, Raven 1100 ULTRA, Raven 1170, Raven 1200 (manufactured by Columbian), DB1305 (manufactured by KOSCO), Sunblack 700, 705, 710, 715, 720, 725, 300, 305, 320, 325, X25, X45 (manufactured by Asahi Carbon Co., Ltd.), N220, N110, N234, N121 (manufactured by Sid Richardson), Niteron #300 (manufactured by Nippon Steel Chemical Carbon Co., Ltd.), Showblack N134, N110, N220, N234, N219 (manufactured by Cabot Japan K.K.), and the like.

The pigment (I) having a surface acidic group may be obtained by appropriately oxidizing the above pigment.

The pigment may be oxidized by a known method (e.g., liquid-phase oxidation or gas-phase oxidation).

The pigment may be subjected to liquid-phase oxidation using an oxidizing agent (e.g., hydrogen peroxide solution, nitric acid, sulfuric acid, chlorate, persulfate, or percarbonate). For example, the pigment (e.g., carbon black) may be added to an aqueous solution that contains the oxidizing agent, and the mixture may be stirred to obtain a pigment having a surface acidic group. An acidic group can be uniformly introduced into the surface of the pigment (e.g., carbon black) by controlling the amount of the oxidizing agent and the reaction temperature.

The pigment may be subjected to gas-phase oxidation using ozone oxidation or air oxidation. Gas-phase oxidation has advantages in that the drying cost is unnecessary, and the operation is easy as compared with liquid-phase oxidation, for example.

The acidic group introduced into the surface of the pigment by oxidation is not particularly limited as long as the acidic group may undergo an acid-base reaction with the basic compound having an amino group to form a salt. Examples of the acidic group include a carboxyl group, a sulfone group, and the like. The amount (number) of acidic groups introduced into the surface of the pigment may be controlled by controlling the gas-phase oxidation conditions or the liquid-phase oxidation conditions.

An example of producing oxidized carbon black (i.e., black pigment having a surface acidic group) by liquid-phase oxidation is described below.

Carbon black, the oxidizing agent, and the aqueous medium (preferably deionized water) are mixed in a stirring tank in an appropriate quantitative ratio. The mixture is sufficiently stirred in the stirring tank at an appropriate temperature (e.g., room temperature to 90° C., and preferably 60 to 90° C.) so that the carbon black is oxidized to obtain an aqueous dispersion (slurry) of a surface-oxidized pigment (i.e., a carbon black aggregate (agglomerate) on which a hydrophilic functional group (e.g., carboxyl group or hydroxyl group) is formed).

The carbon black can be efficiently dispersed in the slurry, and an acidic group can be uniformly and effectively produced by subjecting the carbon black to wet or dry oxidation in advance. When using wet oxidation, it is preferable to oxidize the carbon black using ozone water, a hydrogen peroxide solution, a peroxo diacid, or a salt thereof. When using dry oxidation, it is preferable to oxidize the carbon black by exposing the carbon black to a gas such as ozone, oxygen, $NO_X$, or $SO_X$.

It is also preferable to use (add) a surfactant so that the surface-oxidized pigment is uniformly dispersed in the slurry. An anionic surfactant, a nonionic surfactant, or a cationic surfactant may be used as the surfactant. Examples of the anionic surfactant include fatty acid salts, alkylsulfuric acid salts, alkylarylsulfonic acid salts, and the like. Examples of the nonionic surfactant include polyoxyethylene alkyl ethers, polyoxyethylene alkyl aryl ethers, and the like. Examples of the cationic surfactant include alkylamine salts, quaternary ammonium salts, and the like.

The slurry of the surface-oxidized pigment thus obtained may be reacted directly with the basic compound, or the surface-oxidized pigment may be subjected to partial neutralization (i.e., a treatment that neutralizes some of the acidic groups (surface functional groups)) in order to suppress aggregation of the surface-oxidized pigment or an increase in viscosity.

When subjecting the surface-oxidized pigment to partial neutralization, it is preferable to remove reduced salts (i.e., a reduced product of the oxidizing agent) produced by oxidation in advance. The subsequent neutralization reaction proceeds efficiently as a result of removing reduced salts, so that re-aggregation of the surface-oxidized pigment can be suppressed due to an improvement in dispersibility in water. It is preferable to remove reduced salts using a separation membrane such as an ultrafilter (UF) membrane, a reverse osmosis (RO) membrane, or an electrodialysis membrane.

It is preferable to subject the surface-oxidized pigment to partial neutralization by adding a neutralizer to the slurry, and heating the mixture. Examples of the neutralizer include, but are not limited to, alkali salts such as potassium hydroxide and sodium hydroxide, ammonia, and organic amines such as ethanolamine, triethanolamine, dimethylaminoethanol, and quaternary amines. The amount of the neutralizer added to the slurry is adjusted depending on the amount (number) of surface functional groups introduced into the pigment, but is preferably 50 to 100 mol % based on the amount of surface (acidic) functional groups. The pigment may be neutralized at room temperature. It is preferable to add the neutralizer to the slurry of the pigment contained in a stirring tank, and stir the mixture at 40 to 100° C. for 1 to 16 hours.

It is preferable to remove undispersed aggregates and large particles present in the slurry of the pigment by centrifugation, filtration, or the like. The particle size distribution of the resulting pigment aqueous dispersion can be controlled by removing undispersed aggregates and large particles. This makes it possible to suppress clogging of a nozzle during printing when using the pigment aqueous dispersion as an inkjet printer ink composition.

When subjecting the pigment (slurry) to neutralization, it is preferable to remove salts (i.e., an oxide of the neutralizer) produced by neutralization. The dispersibility of the pigment in water can be improved by removing salts, so that re-aggregation of the surface-oxidized pigment can be suppressed. It is preferable to remove salts using a separation membrane such as an ultrafilter (UF) membrane, a reverse osmosis (RO) membrane, or an electrodialysis membrane.

The concentration of the pigment having a surface acidic group in the slurry is preferably 3 to 30 mass %, more preferably 4 to 28 mass %, and still more preferably 5 to 25 mass %. If the concentration of the pigment having a surface acidic group in the slurry is within the above range, the pigment can be easily reacted with the basic compound (II) having two or more amino groups selected from a primary amino group and a secondary amino group in its molecule by adding a given amount of the basic compound (II) to the slurry.

A pigment having a surface acidic group can thus be obtained. Note that a commercially available product such as Aqua-Black (registered trademark) 162 or Aqua-Black (registered trademark) 164 (self-dispersible carbon black) (manufactured by Tokai Carbon Co., Ltd.) may also be used as the pigment having a surface acidic group. When using a commercially available product as the pigment having a surface acidic group, it is preferable to disperse the pigment in the aqueous medium before reacting the pigment with the basic compound (II) having two or more amino groups selected from a primary amino group and a secondary amino group in its molecule. It is more preferable to disperse the pigment in the aqueous medium so that the concentration of the pigment in the aqueous medium is equal to the concentration of the pigment in the slurry (see above).

The average particle size of the pigment (I) having a surface acidic group is preferably 70 to 200 nm, more preferably 80 to 170 nm, and still more preferably 100 to 150 nm Note that the term "average particle size" used herein refers to a particle size at 50% (average particle size D50) in a cumulative volume particle size distribution measured using a laser diffraction particle size analyzer.

The method according to one embodiment of the invention includes causing the pigment (I) having a surface acidic group to come in contact with the basic compound (II) having two or more amino groups selected from a primary amino group and a secondary amino group in its molecule in an aqueous medium so that the pigment has an unreacted surface amino group.

The basic compound (II) having two or more amino groups selected from a primary amino group and a secondary amino group in its molecule is not particularly limited as long as the basic compound (II) may undergo an acid-base reaction with the surface acidic group of the pigment, and may be bonded to the isocyanate end group of the polyurethane resin via a urea bond. Examples of the basic compound (II) include aliphatic polyamines such as ethylenediamine, diethylenetriamine, triethylenetetramine, tetraethylenepentamine, 1,3-propylenediamine, and hexamethylenediamine, aromatic polyamines such as phenylenediamine, diaminonaphthalene, and xylenediamine, alicyclic polyamines such as piperazine, N-aminoethylpiperazine, and isophoronediamine, and the like. These compounds may be used either alone or in combination as the basic compound (II).

It is preferable to use water as the aqueous medium in which the pigment (I) having a surface acidic group is caused to come in contact with the basic compound (II) having two or more amino groups selected from a primary amino group and a secondary amino group in its molecule. Examples of a preferable aqueous medium other than water include a water-soluble solvent that does not react with an amine and an isocyanate, such as acetonitrile and ethers such as tetrahydrofuran, ethylene glycol dimethyl ether, and diethylene glycol dimethyl ether. A glycol aqueous solvent (e.g., ethylene glycol, propylene glycol, butylene glycol, diethylene glycol, triethylene glycol, or polyethylene glycol), dimethyl sulfoxide, sulfolane, or the like may also be used. These aqueous media may be used in combination. Since a glycol aqueous solvent that includes an alcoholic hydroxyl group may react with the isocyanate end group of the polyurethane resin (III), it is preferable to add only a limited amount of glycol aqueous solvent after reacting the pigment with the polyurethane resin (III).

The pigment (I) having a surface acidic group may be caused to come in contact and react with the basic compound (II) having two or more amino groups selected from a primary amino group and a secondary amino group in its molecule by stirring the pigment (I) and the basic compound (II) in the aqueous medium at 20 to 60° C. for 0.5 to 10 hours.

When the pigment (I) having a surface acidic group is caused to come in contact with the basic compound (II) having two or more amino groups selected from a primary amino group and a secondary amino group in its molecule in the aqueous medium, the basic compound is ionically attracted to the surface acidic group of the pigment, and is present on the surface of the pigment (i.e., the pigment has a surface amino group).

The pigment having a surface amino group is then caused to come in contact and react with the polyurethane resin (III) having an isocyanate end group.

The surface amino group of the pigment and the isocyanate group react instantaneously to form a urea bond. Therefore, the polyurethane resin (III) is crosslinked and elongated on the surface of the pigment, so that the polyurethane resin (III) chemically bonds and physically adheres to the surface of the pigment. The surface of the pigment is thus covered (coated) with the polyurethane resin (III).

The polyurethane resin (III) having an isocyanate end group is not particularly limited as long as the isocyanate end group can be bonded to the surface amino group of the pigment via a urea bond. The polyurethane resin having an isocyanate end group is preferably a polyurethane resin obtained by bonding a compound having a functional group or a molecular chain that can be dispersed in the aqueous medium and having two or more hydroxyl groups in its molecule to a polyisocyanate compound via a urethane bond, in order to subsequently react the polyurethane resin with the unreacted surface amino group of the pigment in the aqueous medium.

The compound having a functional group or a molecular chain that can be dispersed in the aqueous medium and having two or more hydroxyl groups in its molecule is preferably a compound having a functional group that can form a salt that causes phase inversion of the polyurethane resin into the aqueous medium.

Examples of a tertiary carboxyl group-containing polyol compound that may be used as the above compound include polyhydroxycarboxylic acids such as dimethylolpropionic acid, dimethylolbutanoic acid, dimethylolacetic acid, dimethylolbutyric acid, dimethylolvaleric acid, and dimethylolcaproic acid. Among these, dihydroxymonocarboxylic acids such as dimethylolpropionic acid and dimethylolbutanoic acid are preferable. Since the tertiary carboxyl group included in the above compounds has very low reactivity with an isocyanate compound, a urethane bond-forming reaction is not hindered, so that the target polyurethane resin can be efficiently produced.

The acid number of the polyurethane resin may be controlled by controlling the amount of the tertiary carboxyl group-containing polyol compound. The acid number of the polyurethane resin may be controlled using a diol compound that includes a nonionic molecular chain in addition to the tertiary carboxyl group-containing polyol compound. Examples of the diol compound that includes a nonionic molecular chain include polyalkylene glycol diols such as polyethylene glycol (PEG) diol, and a copolymer diol of polyethylene glycol (PEG) diol and polypropylene glycol (PPG) diol or polybutylene glycol (PBG) diol.

A polyol having at least two hydroxyl groups in its molecule may be used together with the tertiary carboxyl group-containing polyol compound and the diol compound that includes a nonionic molecular chain in an arbitrary ratio.

Examples of the polyol having at least two hydroxyl groups in its molecule include a side chain-modified diol that has been chemically modified depending on the application via the Michael addition reaction or the like. The balance between the hydrophilicity and the hydrophobicity of the resulting polyurethane resin can be designed in various ways by introducing a hydrophobic group or a hydrophilic group into the side chain of the diol (polyol).

The side chain-modified diol may be synthesized by an addition reaction of a dialkanolamine with a (meth)acrylic acid derivative. The Michael addition reaction or the like can be easily controlled when using an acrylic acid derivative that reacts with a dialkanolamine at a low temperature as compared with a methacrylic acid derivative. Examples of the dialkanolamine include dihydroxyalkyl-substituted derivatives of a secondary amine such as diethanolamine, dipropanolamine, and diisopropanolamine. Examples of the (meth)acrylic acid derivative include, but are not limited to, alkyl (meth)acrylates, cycloalkyl (meth)acrylates, aromatic (meth)acrylates, halogenated alkyl (meth)acrylates, (meth) acrylates, aromatic vinyl compounds, vinyl cyanide compounds, unsaturated dibase acids, and derivatives thereof.

Examples of the alkyl (meth)acrylates include methyl (meth)acrylate, ethyl (meth)acrylate, butyl (meth)acrylate, 2-ethylhexyl (meth)acrylate, and the like.

Examples of the cycloalkyl (meth)acrylates include cyclohexyl (meth)acrylate, methylcyclohexyl (meth)acrylate, bornyl (meth)acrylate, isobornyl (meth)acrylate, adamantyl (meth)acrylate, and the like.

Examples of the aromatic (meth)acrylates include phenyl (meth)acrylate, benzyl (meth)acrylate, and the like.

Examples of the halogenated alkyl (meth)acrylates include fluoromethyl (meth)acrylate, fluoroethyl (meth)acrylate, and the like.

Examples of the (meth)acrylates include hydroxyalkyl (meth)acrylates, glycidyl (meth)acrylate, ethylene glycol (meth)acrylate, polyethylene glycol (meth)acrylate, and the like.

Examples of the aromatic vinyl compounds include styrene, α-substituted styrenes such as α-methylstyrene and α-ethylstyrene, nucleus-substituted styrenes such as fluorostyrene and methylstyrene, and the like.

Examples of the (meth)acrylic acid derivatives include aliphatic monoacrylates such as 2-ethylhexyl (meth)acrylate, lauryl (meth)acrylate, and stearyl (meth)acrylate; alicyclic monoacrylates such as cyclohexyl (meth)acrylate, dicyclopentanyl (metha)acrylate, and isobornyl (meth)acrylate; aromatic monoacrylates such as benzyl (meth)acrylate, phenyl (meth)acrylate, phenoxyethyl (meth)acrylate, phenoxy diethylene glycol (meth)acrylate, phenoxy tetraethylene glycol (meth)acrylate, nonylphenoxyethyl (meth)acrylate, and nonylphenoxy tetraethylene glycol (meth)acrylate; alkyl ether acrylates such as methoxy diethylene glycol (meth)acrylate, ethoxy diethylene glycol (meth)acrylate, butoxyethyl (meth) acrylate, butoxy triethylene glycol (meth)acrylate, and methoxy dipropylene glycol (meth)acrylate; mono(meth)acryloyloxy dibasic acid esters such as 2-(meth)acryloyloxyethyl hydrogen succinate, 2-(meth)acryloyloxyethyl hydrogen hexahydrophthalate, 2-(meth)acryloyloxyethyl hydrogen phthalate, and 2-(meth)acryloyloxypropyl hydrogen phthalate; monoalkyl ether polyoxyalkylene glycol (meth)acrylates such as mono(2-ethylhexyl) ether polyoxyethylene glycol (meth)acrylate, mono(nonylphenyl) ether polyoxyethylene glycol (meth)acrylate, mono(2-ethylhexyl) ether polyoxypropylene glycol (meth)acrylate, and mono(n-onylphenyl) ether polyoxypropylene glycol (meth)acrylate; monoacrylates including a polyoxyethylene ether bond, such as polyethylene glycol mono(meth)acrylate and polypropylene glycol mono(meth)acrylate; hydroxyl group-containing mono(meth)acrylates such as 2-hydroxyethyl (meth)acrylate, 2-hydroxypropyl (meth)acrylate, glycerol mono(meth)acrylate, 2-hydroxy-3-butoxypropyl (meth)acrylate, 2-hydroxy-3-phenoxypropyl (meth)acrylate, and an ε-caprolactone adduct of 2-hydroxyethyl (meth)acrylate; alicyclic ether (meth)acrylates such as glycidyl (meth)acrylate and tetrahydrofurfuryl (meth)acrylate; nitrogen-containing monoacrylates such as N,N-dimethylaminoethyl (meth)acrylate, N,N-diethylaminoethyl (meth)acrylate, morpholino (meth) acrylate, N,N-dimethylacrylamide, dimethylaminopropyl acrylate, and N-isopropylacrylamide; polyoxyalkylene phosphate mono(meth)acrylates such as polyoxyethylene phosphate mono(meth)acrylate and polyoxypropylene phosphate mono(meth)acrylate; and the like.

Examples of the polyol having at least two hydroxyl groups in its molecule include diols such as ethylene glycol, propylene glycol, cyclohexane-1,4-dimethanol, 1,3-butylene glycol, tetramethylene glycol, neopentyl glycol, 1,6-hexanediol, 3-methyl-1,5-pentanediol, 2-ethyl-1,3-hexanediol, 2-butyl-2-ethyl-1,3-propanediol, 2-methyl-1,8-octanediol, 1,9-nonanediol, and cyclohexyldimethanol, and high-molecular-weight polyols.

Examples of the high-molecular-weight polyols include polyester polyols such as a polyester diol, high-molecular-weight diols such as a polylactonediol, a polycarbonatediol, a polybutadienediol, and a butadienediol, polyether polyols, and the like. Further examples of the high-molecular-weight polyols include polymer diols of a compound that includes a rosin skeleton or a hydrogenated rosin skeleton. It is preferable that the high-molecular-weight polyols have a number average molecular weight of 300 to 5000, and more preferably 500 to 3000.

Examples of the polyester polyols include a polyester polyol obtained by condensation of one or two or more of a polyol and a polyol generic component and one or two or more of a polybasic acid and an anhydride thereof.

Examples of the polyol used as the raw material for producing the polyester polyol include ethylene glycol, propylene glycol, cyclohexane-1,4-dimethanol, 1,3-butylene glycol, tetramethylene glycol, neopentyl glycol, 1,6-hexanediol, 3-methyl-1,5-pentanediol, 2-ethyl-1,3-hexanediol, 2-butyl-2-ethyl-1,3-propanediol, 2-methyl-1,8-octanediol, 1,9-nonanediol, cyclohexyldimethanol, bisphenol A, bisphenol F, hydrogenated bisphenol A, hydrogenated bisphenol F, a castor oil-modified diol, a castor oil-modified polyol, and the like.

Examples of the polyol generic component used as the raw material for producing the polyester polyol include alkyl monoglycidyl ethers such as butyl glycidyl ether, 2-ethylhexyl glycidyl ether, lauryl glycidyl ether, decyl glycidyl ether, and stearyl glycidyl ether, and monoepoxy compounds such as an alkyl glycidyl ester ("Cardura E10" manufactured by Shell Japan).

Examples of the polybasic acid and an anhydride thereof used as the raw material for producing the polyester polyol include aliphatic dibasic acids such as succinic acid, adipic acid, azelaic acid, sebacic acid, and a dimer acid, anhydrides thereof, aromatic polybasic acids and anhydrides thereof such as dodecenylsuccinic anhydride, phthalic anhydride, isophthalic acid, terephthalic acid, and trimellitic anhydride, alicyclic polybasic acids and anhydrides thereof such as hydrophthalic anhydride and dimethyl-1,4-cyclohexanedicarboxylic acid, and the like.

Examples of the polylactonediol include a polylactonediol obtained by ring-opening addition polymerization of a hydroxyl-terminated compound (e.g., polyol or polyester polyol) and a monomer that includes a lactone ring (e.g., ε-caprolactone or β-methyl-δ-valerolactone).

Examples of the polycarbonatediol include a polycarbonatediol obtained using a diol such as 1,4-butanediol, 1,6-hexanediol, 3-methyl-1,5-pentanediol, 2-ethyl-1,3-hexanediol, 2-butyl-2-ethyl-1,3-propanediol, 1,9-nonanediol, or 2-methyl-1,8-octanediol as a raw material.

Examples of the polybutadienediol include a polybutadienediol shown by the following formula ("Poly bd R-15HT" and "Poly bd R-45HT" (manufactured by Idemitsu Kosan Co., Ltd.)), a polyisoprenediol ("Poly ip" manufactured by Idemitsu Kosan Co., Ltd.), an α,ω-polybutadiene glycol ("G-1000", "G-2000", and "G-3000" manufactured by Nippon Soda Co., Ltd.), and the like.

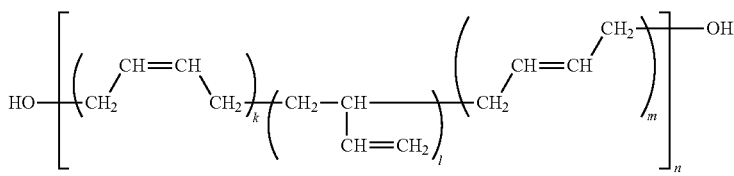

wherein k=0.2, l=0.2, m=0.6, and n is a positive integer.

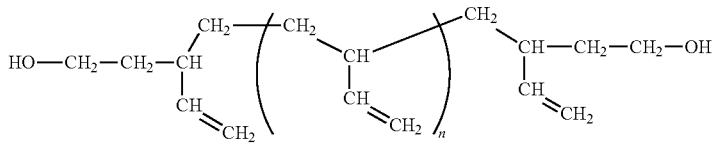

wherein n is a positive integer.

Examples of the polyether polyol include a polyether polyol obtained by adding propylene oxide, tetrahydrofuran, or butylene oxide to a polyalkylene glycol (e.g., polyethylene glycol (PEG) diol, polypropylene glycol (PPG) diol, or polybutylene glycol (PBG) diol), bisphenol A, bisphenol F, hydrogenated bisphenol A, hydrogenated bisphenol F, or the like.

Examples of the polymer diols (b) of a compound that includes a rosin skeleton or a hydrogenated rosin skeleton include Pine Crystal D-6011 and Pine Crystal D-6240 (manufactured by Arakawa Chemical Industries, Ltd.).

The polyisocyanate compound is not particularly limited as long as the compound includes two or more isocyanate groups in its molecule. A diisocyanate compound or a polyisocyanate compound that includes three or more isocyanate groups may be used depending on the application.

Examples of the diisocyanate compound include diphenylmethane diisocyanate (hereinafter referred to as "MDI"), a polyphenylenepolymethylene polyisocyanate, tolylene diisocyanate (hereinafter referred to as "TDI"), xylylene diisocyanate, tetramethylxylylene diisocyanate, isophorone diisocyanate (3-isocyanatomethyl-3,5,5-trimethylcyclohexyl isocyanate (hereinafter referred to as "IPDI")), hexamethylene diisocyanate (hereinafter referred to as "HDI"), tetramethylene diisocyanate, dodecamethylene diisocyanate, trimethylhexamethylene diisocyanate, 1,3-cyclohexylene diisocyanate, naphthalene diisocyanate, hydrogenated diphenylmethane diisocyanate (hereinafter referred to as "hydrogenated MDI"), hydrogenated xylylene diisocyanate, a compound obtained by substituting some of the isocyanate groups of an isocyanate group-containing compound with a biuret group, an allophanate group, a carbodiimide group, a uretonimine group, an oxazolidone group, an amide group, an imide group, an isocyanurate group, or a urethodione group, and the like. These compounds may be used either alone or in combination.

When the isocyanate group included in the polyurethane resin (III) having an isocyanate end group reacts with the basic compound (II) that has two or more amino groups in its molecule and is present on the surface of the pigment (I) that is dispersed in water, a competing reaction of the amino group and water (solvent) occurs. Therefore, a nonaromatic diisocyanate compound that has a low rate of reaction with water as compared with an aromatic diisocyanate compound (e.g., MDI or TDI) is preferable as the diisocyanate compound. In particular, the basic compound (II) having two or more amino groups in its molecule and the polyurethane resin (III) having an isocyanate end group react preferentially when using an alicyclic diisocyanate compound (e.g., IPDI or hydrogenated MDI) or an aliphatic diisocyanate (e.g., 1,6-hexamethylene diisocyanate).

When producing the polyurethane resin (III) having an isocyanate end group by bonding a compound having a functional group or a molecular chain that can be dispersed in the aqueous medium and having two or more hydroxyl groups in its molecule to a polyisocyanate compound (e.g., diisocyanate compound) via a urethane bond, a polyurethane resin that includes an isocyanate group on each end can be obtained by mixing the compounds so that the number of equivalents of the isocyanate groups of the polyisocyanate compound is larger than the number of equivalents of the hydroxyl groups of the polyol (e.g., a compound having a functional group or a molecular chain that can be dispersed in the aqueous medium and having two or more hydroxyl groups in its molecule) by 2 or more. For example, when using a diol compound as the polyol, and using a diisocyanate compound as the polyisocyanate compound, the compounds are used so that the number of moles of the diisocyanate compound is larger than the number of moles of the diol compound by 1. A polymer having an isocyanate end group may be accurately obtained (i.e., a polyurethane resin that exhibits a small variation in molecular weight distribution may be obtained) by synthesizing an isocyanate-terminated oligomer stepwise (i.e., increasing the molecular weight stepwise).

When producing a polyurethane resin by reacting a diol compound (i.e., polyol) and a diisocyanate compound, a polyurethane resin having an isocyanate end group may be synthesized by reacting the diol compound and the diisocyanate compound in an organic solvent so that the total number of moles of the diisocyanate compound is "n+1" when the total number of moles of the diol compound is referred to as "n".

It is preferable that the polyurethane resin (III) having an isocyanate end group have an acid number of 20 to 120 KOHmg/g so that the polyurethane resin (III) can be dispersed in water. The acid number of the polyurethane resin (III) may be adjusted by adjusting the number of moles of a tertiary carboxyl group-containing diol compound or the like.

When using a tertiary carboxyl group-containing diol compound as the compound having a functional group or a molecular chain that can be dispersed in the aqueous medium and having two or more hydroxyl groups in its molecule, and using a diisocyanate compound as the polyisocyanate compound, the acid number (AN) of the polyurethane resin (III) having an isocyanate end group is calculated by the following expression.

$$AN = \frac{a1 \cdot 56.11 \cdot 10^3}{\sum_{n=1}^{n} an \cdot An + \sum_{n=1}^{n} bn \cdot Bn}$$

where, a1 is the number of moles of the tertiary carboxyl group-containing diol compound (e.g., dimethylolpropionic acid), A1 is the molecular weight of the tertiary carboxyl group-containing diol compound (e.g., dimethylolpropionic acid), an is the number of moles of another diol, An is the molecular weight of the other diol, bn is the number of moles of the diisocyanate compound, and Bn is the molecular weight of the diisocyanate compound.

When using a diol compound as the polyol, and using a diisocyanate compound as the polyisocyanate compound, the number average molecular weight of the polyurethane resin (III) having an isocyanate end group is calculated by the following expression.

Number average molecular weight$=nA'+(n+1)B'$ where, n is the total number of moles of the polyol, A' is the number average molecular weight of the polyol, and B' is the number average molecular weight of the diisocyanate compound.

The number average molecular weight of the polyurethane resin (III) having an isocyanate end group is preferably 1000 to 15,000, more preferably 1300 to 10,000, and still more preferably 1600 to 8000. The acid number of the polyurethane resin (III) is preferably 20 to 120 KOHmg/g, more preferably 30 to 110 KOHmg/g, and still more preferably 35 to 100 KOHmg/g.

When producing the polyurethane resin using a trifunctional or higher functional polyol and the polyisocyanate compound, it is desirable to prevent gelation by adjusting the molar fraction in accordance with Flory's equation or the like.

When producing the polyurethane resin (III) having an isocyanate end group, the polyol and the polyisocyanate compound are preferably reacted at 60 to 80° C. in order to suppress side reactions. The polyol and the polyisocyanate compound may be reacted without using a solvent, or may be reacted using an arbitrary organic solvent (e.g., ethyl acetate, methyl ethyl ketone, or acetonitrile) that is normally used for a urethane reaction. An arbitrary urethane reaction catalyst such as a tertiary amine catalyst, dibutyltin laurate, or tin(II) octylate may be used when reacting the polyol and the polyisocyanate compound. Note that the urethane reaction catalyst need not necessarily be used.

When producing the polyurethane resin (III) having an isocyanate end group using a tertiary carboxyl group-containing polyol compound or the like, it is preferable to appropriately add a tertiary amine such as triethylamine, trimethylamine, N-methylmorpholine, tributylamine, N-methylpyrazine, or methylidazole during phase inversion of the polyurethane resin into the aqueous medium.

When causing the pigment having an unreacted surface amino group to come in contact and react with the polyurethane resin (III) having an isocyanate end group, the polyurethane resin (III) is preferably used (added) in an amount of 0.1 to 80 parts by weight, and more preferably 0.5 to 30 parts by weight, based on 100 parts by weight of the pigment. If the amount of the polyurethane resin (III) is less than 0.1 parts by weight, the image density may not be improved. If the amount of the polyurethane resin (III) exceeds 80 parts by weight, the image density and the storage stability may deteriorate due to too large an amount of the polyurethane resin (III).

The isocyanate group included in the polyurethane resin (III) having an isocyanate end group is preferably reacted with the basic compound (II) that has two or more amino groups in its molecule and is present on the surface of the pigment (I) that is dispersed in water at 50° C. or less, and more preferably 25 to 40° C. Since a difference in rate of reaction occurs when the reaction temperature is within the above range, the basic compound (II) and the polyurethane resin (III) reacts preferentially as compared with a reaction of the polyurethane resin (III) and the aqueous medium.

The polyurethane resin that functions as a dispersant can be physically and chemically bonded to the surface of the pigment by thus reacting the unreacted surface amino group of the pigment with the isocyanate end group of the polyurethane resin to form a urea bond.

Polyurethane Resin-Bonded Pigment Aqueous Dispersion

A polyurethane resin-bonded pigment aqueous dispersion according to one embodiment of the invention is described below.

The polyurethane resin-bonded pigment aqueous dispersion according to one embodiment of the invention is produced by causing (I) a pigment having a surface acidic group to come in contact with (II) a basic compound having two or more amino groups selected from a primary amino group and a secondary amino group in its molecule in an aqueous medium so that the pigment has an unreacted surface amino group, and causing the pigment to come in contact and react with (III) a polyurethane resin having an isocyanate end group.

In the polyurethane resin-bonded pigment aqueous dispersion according to one embodiment of the invention, the pigment (I) having a surface acidic group is dispersed in the aqueous medium, and physically and chemically bonded to the polyurethane resin (III) having an isocyanate end group via the basic compound (II) having two or more amino groups selected from a primary amino group and a secondary amino group in its molecule.

Note that the aqueous medium, the pigment (I) having a surface acidic group, the basic compound (II) having two or more amino groups selected from a primary amino group and a secondary amino group in its molecule, the polyurethane resin (III) having an isocyanate end group, and the production methods thereof are the same as described above. The polyurethane resin-bonded pigment aqueous dispersion according to one embodiment of the invention may suitably be produced by the method according to one embodiment of the invention (see above).

The polyurethane resin-bonded pigment aqueous dispersion according to one embodiment of the invention exhibits excellent image density, dispersibility, and storage stability since the pigment (I) having a surface acidic group is dispersed in the aqueous medium, and strongly physically and chemically bonded to the polyurethane resin (III) having an isocyanate end group via the basic compound (II) having two or more amino groups selected from a primary amino group and a secondary amino group in its molecule.

Ink Composition

An ink composition according to one embodiment of the invention is described below.

The ink composition according to one embodiment of the invention includes a polyurethane resin-bonded pigment aqueous dispersion produced by the method according to one embodiment of the invention, or the polyurethane resin-bonded pigment aqueous dispersion according to one embodiment of the invention.

The ink composition according to one embodiment of the invention includes the polyurethane resin-bonded pigment aqueous dispersion as an essential component. When using the ink composition as an inkjet ink, the ink composition may appropriately include known additives such as a moisturizer, a preservative, an emulsifier, a pH-adjusting agent, and an anti-foaming agent (e.g., glycerol, a polyoxyalkylene ether glycol such as diethylene glycol, triethylene glycol, or dipropylene glycol, or a monoalkyl ether or dialkyl ether of a polyoxyalkylene ether glycol), a water-based resin, a resin emulsion, and the like.

The concentration of the polyurethane resin-bonded pigment in the ink composition according to one embodiment of the invention may be the same as that of a known inkjet ink, and may be adjusted depending on the type of pigment. For example, the concentration of the polyurethane resin-bonded pigment in the ink composition may be 2 to 10 wt %.

The ink composition according to one embodiment of the invention may be prepared by an arbitrary method.

For example, the ink composition may be prepared by adding an additive (e.g., moisturizer, preservative, emulsifier, pH-adjusting agent, and anti-foaming agent), a water-based resin, a resin emulsion, and the like to the polyurethane resin-bonded pigment aqueous dispersion (essential component) with stirring, and filtering the mixture by an arbitrary method.

The invention is further described below by way of examples. Note that the invention is not limited to the following examples.

EXAMPLES

Example 1

Synthesis of Isocyanate (NCO)-Terminated Waterborne Polyurethane
(1) Synthesis of Side Chain-Modified Diol A flask equipped with a stirring rod, a dry nitrogen supply tube, and a condenser was charged with 190 parts by weight of N,N'-diethanolamine and 810 parts by weight of Light Acrylate NP-4EA (nonylphenyl tetraethylene ether glycol acrylate) (manufactured by Kyoeisha Chemical Co., Ltd.). The mixture was reacted at 80° C. for 7 hours to obtain a diol having a nonylphenyl side chain (hereinafter referred to as "diol LKG-1"). The ratio of the tertiary amine number to the total amine number of the reaction product was 0.98 or more.
(2) Synthesis of Isocyanate-Terminated Waterborne Polyurethane A flask equipped with a stirring rod, a nitrogen gas supply tube, and an Allihn condenser was charged with 400 parts by weight of methyl ethyl ketone, 60.4 parts by weight (2.6 mol) of dimethylolbutanoic acid, 96.1 parts by weight (0.8 mol) of a castor oil-modified diol ("HS-2G-160R" manufactured by Hokoku Co., Ltd.), 129.7 parts by weight (0.4 mol) of a polyester diol ("Kuraray Polyol P-2050" manufactured by Kuraray Ltd., number average molecular weight: 2066), 104.5 parts by weight (1.2 mol) of the diol LKG-1 synthesized in (1), and 209.3 parts by weight (6 mol) of isophorone diisocyanate. The mixture was reacted at 65° C. for 7 hours. The isocyanate group concentration in the reaction mixture was 1.35 wt %, and the acid number of the solid was 38 KOHmg/g.

The reaction mixture was then cooled to 35° C. After the addition of 41.2 parts by weight of triethylamine, the mixture was stirred for 30 minutes to obtain an isocyanate-terminated waterborne polyurethane (nonvolatile (solid) content: 58 wt %, Gardner bubble viscosity: J to K, GPC number average molecular weight: 1790, weight average molecular weight: 5550, ratio of number of moles of OH groups to number of moles of NCO groups: 5/6) (hereinafter referred to as "polyurethane resin 1").
Production of Pigment Dispersion 51.6 g of a 5% aqueous solution of piperazine.6H$_2$O (Mw=194) (basic compound) was added to 1 kg of Aqua-Black (registered trademark) 162 (manufactured by Tokai Carbon Co., Ltd., solid content: 19.2 wt %) (carbon black having a surface acidic group). The mixture was stirred at room temperature for 30 minutes. After the addition of 82.8 g of the polyurethane resin 1 (solid content: 58.0 wt %), the mixture was stirred at room temperature for 3 hours, and then stirred at 40° C. for 1 hour to obtain a polymer-bonded pigment aqueous dispersion (hereinafter referred to as "pigment aqueous dispersion 1").

Example 2

Synthesis of Isocyanate (NCO)-Terminated Waterborne Polyurethane
(1) Synthesis of Side Chain-Modified Diol A diol LKG-1 was obtained in the same manner as in (1) of Example 1.
(2) Synthesis of Isocyanate-Terminated Waterborne Polyurethane A flask equipped with a stirring rod, a nitrogen gas supply tube, and an Allihn condenser was charged with 400 parts by weight of methyl ethyl ketone, 60.7 parts by weight (2.8 mol) of dimethylolbutanoic acid, 78.5 parts by weight (0.7 mol) of a castor oil-modified diol ("HS-2G-150" manufactured by Hokoku Co., Ltd., number average molecular weight: 765.3), 151.4 parts by weight (0.5 mol) of a polyester diol ("Kuraray Polyol P-2050" manufactured by Kuraray Ltd., number average molecular weight: 2066), 56.9 parts by weight (0.7 mol) of the diol LKG-1 synthesized in (1), 44 parts by weight (0.3 mol) of polyethylene ether glycol ("#1000" manufactured by NOF Corporation, number average molecular weight: 1002), 114 parts by weight (3.5 mol) of isophorone diisocyanate ("Desmodule" manufactured by Sumika Bayer Urethane Co., Ltd.), and 94.5 parts by weight (2.5 mol) of hydrogenated MDI ("Desmodule W" manufactured by Sumika Bayer Urethane Co., Ltd.). The mixture was reacted at 65° C. for 7 hours. The isocyanate group concentration in the reaction mixture was 1.35 wt %, and the acid number of the solid was 38 KOHmg/g. The reaction mixture was then cooled to 35° C. After the addition of 41.2 parts by weight of triethylamine, the mixture was stirred for 30 minutes to obtain an isocyanate-terminated waterborne polyurethane (nonvolatile (solid) content: 61.8 wt %, Gardner bubble viscosity: K to L, GPC number average molecular weight: 1790, weight average molecular weight: 4050, ratio of number of moles of OH groups to number of moles of NCO groups: 5/6) (hereinafter referred to as "polyurethane resin 2").
Production of Pigment Dispersion 1 g of a 5% aqueous solution of piperazine.6H$_2$O (Mw=194) (basic compound) was added to 1 kg of Aqua-Black (registered trademark) 162 (manufactured by Tokai Carbon Co., Ltd., solid content: 19.2 wt %) (carbon black having a surface acidic group). The mixture was stirred at room temperature for 30 minutes. After the addition of 1.2 g of the polyurethane resin 2 (solid content: 61.8 wt %), the mixture was stirred at room temperature for 3 hours to obtain a polymer-bonded pigment aqueous dispersion (hereinafter referred to as "pigment aqueous dispersion 2").

Comparative Example 1

Synthesis of Isocyanate (NCO)-Terminated Waterborne Polyurethane

A polyurethane resin 2 was obtained in the same manner as in Example 2.
Production of Pigment Dispersion 1 g of a 5% aqueous solution of morpholine (Mw=87.1) (basic compound) was added to 1 kg of Aqua-Black (registered trademark) 164 (manufactured by Tokai Carbon Co., Ltd., solid content: 19.2 wt %) (carbon black having a surface acidic group). The mixture was stirred at room temperature for 30 minutes. After the addition of 3.1 g of the polyurethane resin 2 (solid content: 61.8 wt %), the mixture was stirred at room temperature for 3 hours to obtain a polymer-bonded pigment aqueous dispersion (hereinafter referred to as "comparative pigment aqueous dispersion 1").

Comparative Example 2

32 g of an anionic polyurethane dispersion ("W-6010" manufactured by Mitsui Chemicals Polyurethanes, Inc., NV: 30%, average particle size: 60 nm, pH: 7.8) was added to 1 kg of Aqua-Black (registered trademark) 164 (manufactured by Tokai Carbon Co., Ltd., solid content: 19.2 wt %) (carbon black having a surface acidic group). The mixture was stirred at room temperature for 3 hours to obtain a polymer-bonded pigment aqueous dispersion (hereinafter referred to as "comparative pigment aqueous dispersion 2").
Evaluation of Image Density
(1) The pigment content of the pigment aqueous dispersions obtained in Examples 1 and 2 and Comparative Examples 1 and 2 was adjusted to 15 wt %, and an inkjet recording ink composition was prepared in accordance with the following ink formulation.
Pigment aqueous dispersion (pigment content: 15.0 wt %): 40.0 wt %
Glycerol: 20.0 wt %
Surfactant: 0.2 wt %
Amine compound: 0.2 wt %
Deionized water: 38.4 wt %
(2) An ink cartridge was charged with the ink composition obtained in (1), and an image was printed on plain paper using an inkjet printer ("EM-930C" manufactured by Seiko Epson Corporation). The image density was evaluated by measuring the OD value using a spectrodensitometer "X-Rite", and evaluating the average OD value in accordance with the following standard. The results are shown in Table 1.
Acceptable: The OD value was 1.4 or more.
Fair: The OD value was 1.3 or more and less than 1.4.
Unacceptable: The O.D. value was less than 1.3.

TABLE 1

|  | OD value | Image density |
|---|---|---|
| Example 1 | 1.41 | Acceptable |
| Example 2 | 1.42 | Acceptable |
| Comparative Example 1 | 1.21 | Fair |
| Comparative Example 2 | 1.19 | Fair |

Evaluation of Storage Stability

Each of the pigment aqueous dispersions obtained in Examples 1 and 2 and Comparative Examples 1 and 2 was put in an airtight glass bottle, and stored at 70° C. for 4 weeks in an incubator. The viscosity (mPa·s) and the particle size (nm) were measured before and after the test, and the storage stability was evaluated in accordance with the following standard. The results are shown in Table 2.
Acceptable: The change rate was within ±5%.
Fair: The change rate was within ±5 to 10%.
Unacceptable: The change rate was 10% or more.

TABLE 2

|  | Example 1 | | Example 2 | | Comparative Example 1 | | Comparative Example 2 | |
|---|---|---|---|---|---|---|---|---|
|  | Viscosity (cps) | Average particle size (nm) | Viscosity (cps) | Average particle size (nm) | Viscosity (cps) | Average particle size (nm) | Viscosity (cps) | Average particle size (nm) |
| Initial value | 9.52 | 139.6 | 9.74 | 141.7 | 9.40 | 145.4 | 9.41 | 139.2 |
| After storage at 70° C. for 4 weeks | 9.25 | 136.5 | 9.43 | 137.7 | 9.88 | 154.3 | 10.02 | 148.7 |
| Change rate (%) | −2.84 | −2.22 | −3.18 | −2.82 | 5.11 | 6.12 | 6.48 | 6.82 |
| Storage stability | Acceptable | Acceptable | Acceptable | Acceptable | Fair | Fair | Fair | Fair |

As is clear from the results shown in Tables 1 and 2, the pigment aqueous dispersions obtained in Examples 1 and 2 exhibited excellent image density, dispersibility, and storage stability.

INDUSTRIAL APPLICABILITY

The invention thus provides a method of producing a pigment aqueous dispersion that exhibits excellent image density, dispersibility, and storage stability, a pigment aqueous dispersion, and an ink composition.

The invention claimed is:

1. A method of producing a polyurethane resin-bonded pigment aqueous dispersion comprising causing (I) a pigment having a surface acidic group to come in contact with (II) a basic compound having two or more amino groups selected from a primary amino group and a secondary amino group in its molecule in an aqueous medium so that the pigment has an unreacted surface amino group, and causing the pigment to come in contact and react with (III) a polyurethane resin having an isocyanate end group.

2. The method according to claim 1, wherein the pigment is carbon black.

3. An ink composition comprising a polyurethane resin-bonded pigment aqueous dispersion produced by the method according to claim 2.

4. An ink composition comprising a polyurethane resin-bonded pigment aqueous dispersion produced by the method according to claim 1.

5. A polyurethane resin-bonded pigment aqueous dispersion produced by causing (I) a pigment having a surface acidic group to come in contact with (II) a basic compound having two or more amino groups selected from a primary amino group and a secondary amino group in its molecule in an aqueous medium so that the pigment has an unreacted surface amino group, and causing the pigment to come in contact and react with (III) a polyurethane resin having an isocyanate end group.

6. The polyurethane resin-bonded pigment aqueous dispersion according to claim 5, wherein the pigment is carbon black.

7. An ink composition comprising the polyurethane resin-bonded pigment aqueous dispersion according to claim 6.

8. An ink composition comprising the polyurethane resin-bonded pigment aqueous dispersion according to claim 5.

* * * * *